United States Patent Office 3,637,830
Patented Jan. 25, 1972

3,637,830
CATALYTIC PROCESS OF NO OXIDATION OF DIALKYLNAPHTHALENES
William D. Vanderwerff, West Chester, Pa., and Henry J. Peterson, Wilmington, Del., assignors to Sun Oil Company, Philadelphia, Pa.
No Drawing. Filed Nov. 25, 1968, Ser. No. 778,803
Int. Cl. C07c 47/52, 63/02
U.S. Cl. 260—524 R          32 Claims

ABSTRACT OF THE DISCLOSURE

Useful partial oxidation products of dialkylnaphthalenes, such as the naphthalenedicarboxaldehyde and the naphthalenedicarboxylic acid are prepared by using molecular oxygen and a catalytic amount of nitric oxide or nitrogen dioxide, that is, substantially less than the stoichiometric amount of nitrogen dioxide necessary to oxidize the dialkylnaphthalenes. The catalyst is a combination of 0.01 moles to 0.6 mole of the nitrogen oxide per mole of dialkylnaphthalene and 0.1 to 6 weight percent of selenium. The oxidations are carried at superatmospheric pressures in a closed system at temperatures of about 160–275° C. Oxygen is added in at least the stoichiometric amount needed for the oxidations. In the temperature range of about 160–225° C. the dialdehyde is the predominant product; at about 225 to 275° C. the diacid predominates.

---

This invention relates to a process for the partial oxidation of dialkylnaphthalenes. Particularly it relates to oxidations in the presence of molecular oxygen and catalytic quantities of selenium and nitric oxide (NO) or nitrogen dioxide ($NO_2$). More particularly, it relates to the partial oxidation of 2,6-dialkylnaphthalenes. Even, more particularly, it is concerned with the preparation of the 2,6-naphthalenedicarboxylic acid.

Several methods have been employed for the oxidation of dialkylnaphthalenes. One known procedure involves the use of molecular oxygen (e.g., air) at temperatures in the range of 100–250° C. while using a catalyst system comprising a heavy metal oxidation catalyst and bromine or a bromine compound, such as cobalt acetate-ammonium bromide as exemplified in Saffer et al., U.S. Pat. No. 2,833,816, issued May 6, 1958.

Another method employed to oxidize dialkylnaphthalenes is the so-called Carbogen process, which involves oxidizing the dialkylnaphthalene by passing nitrogen dioxide into a solution of the dialkylnaphthalene in an inert solvent at a temperature in the range of 160° to 225° C. in the presence of a selenium catalyst, and is described in detail in Roberts et al., U.S. Pat. No. 3,268,294, issued Aug. 23, 1966.

In commercial practice, the nitrogen dioxide oxidation has one serious drawback that makes it economically and technologically less attractive than the molecular oxygen oxidation in that the nitric oxide which is produced in the oxidation reaction must be recovered and regenerated to nitrogen dioxide. The present invention provides a means of overcoming this drawback by the use of either nitric oxide or nitrogen dioxide in catalytic amounts, while molecular oxygen is added in at least stoichiometric amounts.

Briefly stated the present invention is a process for the partial oxidation of dialkylnaphthalenes comprising reacting dialkylnaphthalene in a solvent, in a reaction zone, with molecular oxygen in the presence of a catalyst comprising selenium and nitric oxide or nitrogen dioxide and recovering the oxidation product while maintaining a liquid phase in the zone, the solvent being substantially inert in the reaction.

Dialkylnaphthalenes are obtained from coal tar or cracked petroleum fractions. The recovery and purification of the various dialkylnaphthalenes are well known and most are commercially available. Of particular interest in the present oxidations are the dimethylnaphthalenes such as 2,6-dimethylnaphthalene; 2,7-dimethylnaphthalene; 1,5-dimethylnaphthalene; 1,8-dimethylnaphthalene and the like. Alkyl substituents other than methyl are suitable; for example: ethyl, propyl, butyl, octyl and nonyl up to about 10 carbon atoms generally. Chain branching at the alpha carbon atom of the alkyl substituent is not desirable, however, since there may be side reactions which reduce the yield of the desired products and make subsequent separation and purification more difficult. Thus unbranched alkyl radicals of 1 to 10 carbon atoms are preferred and methyl radicals are more preferred.

The temperature employed will be determined in part by the desired extent of oxidation and the particular products that are to be maximized. The minimum temperature is about 160° C. and is determined by the rate of regeneration of the selenium portion of the catalyst system. The active form of this catalyst is $SeO_2$ and in the performance of its function is reduced to Se; the reoxidation of Se to $SeO_2$ by $NO_2$ is inoperably slow at temperatures below about 160° C. The upper limit of the oxidation is about 275° C.

The system employed for the reaction is closed for the practical reason that the small amount of NO or $NO_2$ present would be swept away with any vented materials. The vapor pressures of the solvents and substrates operable within the scope of this invention are sufficiently low that no special precautions need be taken to maintain the solvent and the dialkylnaphthalene feed in a liquid phase. At 300° C. the product was a black, tarry mixture having less than 10% yield of desirable oxidation products; the principal products were polymeric materials.

The principal products of the present oxidations are:

alkylnaphthaldehyde
alkylnaphthoic acid
naphthalenedicarboxaldehyde
formyl naphthoic acid
naphthalenedicarboxylic acid Two of these products are of particular interest and can be obtained in high yields. The first product to which the instant process is directed is the naphthalenedicarboxaldehyde. This dialdehyde is a precursor of the second product to which the invention is directed, that is, naphthalenedicarboxylic acid. Thus, the naphthalenedicarboxaldehyde is a lesser oxidized product and its yield is maximized in the process at temperatures in the range of about 160 to 225° C. At temperatures above about 225° C. to about 275° C. the yield of naphthalenedicarboxylic acid is maximized.

As stated hereinabove, the present process employs a catalytic amount of NO or $NO_2$. By the term catalytic amount of NO or $NO_2$ is meant substantially less than the stoichiometric requirement of $NO_2$. The advantage to be gained from the present process over the prior art is that NO by-product need not be recovered and regenerated to $NO_2$. Thus, the lower limit of NO or $NO_2$ employed is that whereby the oxidation with molecular oxygen will proceed to produce reasonable yields of the desired oxidation products. The lower limit of NO or $NO_2$ required for the instant oxidations has been found to be about 0.01 moles of NO or $NO_2$ per mole of dialkylnaphthalene to be oxidized. In terms of $NO_2$ this is only 0.167 percent of the stoichiometric requirement for the oxidation of dimethylnaphthalene to the dicarboxylic acid as can be seen from the following equation:

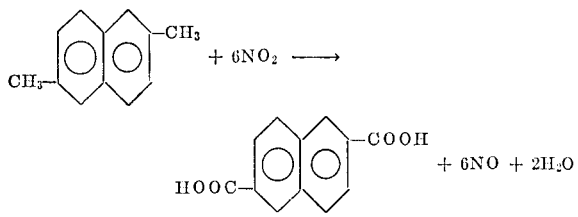

The stoichiometric requirement of $NO_2$ for the oxidation to the dialdehyde is only 4 moles of $NO_2$ per mole of dimethylnaphthalene, e.g.,

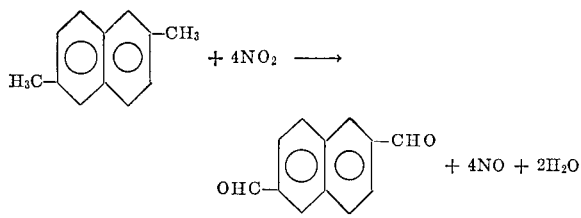

The upper limit of $NO_2$ concentration is a purely economic consideration since in the prior art the oxidation is known to give good yields at about 200° C. with stoichiometric or excess quantities of $NO_2$. It would not be advisable to attempt the prior art oxidation with stoichiometric or excess $NO_2$ at 275° C., since the reaction could be explosive. In consideration of the above factors the present process preferably employs no more than about 0.6 mole of NO or $NO_2$ per mole of dialkylnaphthalene to be oxidized. This is 10 percent of the stoichiometric requirement of $NO_2$ for the oxidation to the dicarboxylic acid when the dialkylnaphthalene is a dimethylnaphthalene. More preferably no more than 0.3 mole of NO or $NO_2$ per mole of dialkylnaphthalene will be employed.

The catalytic quantities of $NO_2$ employed require higher temperatures than the analogous prior art oxidations; however, temperatures higher than 275° C. will generally not result in the desired partial oxidations. Although there is no abrupt change at 275° C., reactions at above this temperature result in more and more tarry polymerization products until at 300° C. there is less than 10% yield of desired oxidation products.

The second component of the catalyst system is selenium which may be added either as selenium metal or as the dioxide. While the mechanism of the present partial oxidation is not completely understood, various routes can be proposed which seem to explain the results. It has been proposed that oxygen added to the reaction reoxidizes NO to $NO_2$ which in turn oxidizes Se to $SeO_2$. The $SeO_2$ in turn accomplishes the initial oxidative attack on the hydrocarbon, converting methyl groups to aldehydes and n-alkyl groups to ketones. Further oxidation of these intermediate products to carboxylic acids requires $NO_2$ directly. But regardless of the mechanism the present catalytic procedure is operable only in the presence of both NO or $NO_2$ and selenium. The selenium is present in catalytic quantities which for the present purpose is from about 0.1 to 6 weight percent of the dialkylnaphthalene to be oxidized. It is understood that the proposed mechanism is not intended as a limitation on the invention or the scope of the claims.

In actual operation of the procedure, $NO_2$ per se is preferably not charged to the reaction zone since it is more difficult to handle under pressure. Instead of $NO_2$, NO is charged to the reaction zone where it remains in the gaseous state. Under the proposed mechanism the addition of molecular oxygen to the system converts the NO to $NO_2$ which then immediately enters into the various oxidations previously described whereby it is reduced to NO. The cycle is continuously repeated until the reaction is completed.

The oxygen used can be in the form of substantially pure oxygen gas or gaseous mixtures containing lower concentrations of oxygen, such as air. The total amount of oxygen added to the reaction system will be in most instances an excess of the stoichiometric amount needed. The minimum amount of molecular oxygen added is the stoichiometric amount needed to oxidize the dialkylnaphthalene to the dialdehyde or diacid as the case may be. Thus, three moles of molecular oxygen are required to oxidize one mole of dimethylnaphthalene to the diacid and 2 moles are needed to produce the dialdehyde. Since the system employed is a closed system there is adequate opportunity under the conditions of temperature and pressure employed for the utilization of the oxygen. The injection of molecular oxygen into the reaction system usually will be at a constant rate and one that is dependent on the rate of oxygen consumption. The rate of oxygen consumption of course will vary with temperature and catalyst concentration. The minimum rate of oxygen injection should be its rate of consumption if the reaction is to proceed efficiently, but the maximum rate is determined principally by equipment and economic limitations.

The solvent employed is one that is substantially inert in the reaction to the other components and products of the reaction. Among the suitable solvents are the halogenated mononuclear aromatics of the structure

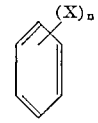

where X is selected from the group consisting of bromo, chloro and fluoro and $n$ is 1–6 and mixtures thereof such as mono-, di- and tri-, tetra-, penta- and hexachloro, bromo and fluoro benzenes. Other materials such as diphenyl ethers and chlorinated biphenyls, also can be used. The di-, tri- and tetrachlorobenzenes are particularly preferred. The boiling point of the solvent is not of particular significance because of the closed reactor which is employed.

The following examples will illustrate the operation of the invention in its various aspects. Work-up of the reaction mixtures included initial separation into fractions soluble and insoluble in the solvent as room temperature. These fractions were then separated into acidic and non-acidic sub-fractions by titration with sodium bicarbonate solution. The isolated acidic fractions were converted into either methyl or trimethylsilyl esters by known procedures. The non-acidic and esterified acidic fractions were then analyzed by calibrated vapor phase chromatographic techniques.

EXAMPLE 1

The oxidation was carried out in a one-liter, titanium stirred autoclave equipped with two gas inlet ports and a pressure gauge on the head. The flow of oxygen through one of these ports into the vapor space of the reactor was regulated by a micro metering valve.[1] The 500 ml. liquid ---
[1] Which was calibrated in ml. per minute measured at one atmosphere and room temperature.

phase normally maintained in the reactor was agitated by a high-speed, twin turbine stirrer. To this vessel was charged 62.5 grams (0.40 mole) of 2,6-dimethylnaphthalene, 2.4 grams of selenium metal and 500 ml. of commercial trichlorobenzene. The vapor space was then flushed with nitrogen to remove all traces of oxygen and subsequently flushed with nitric oxide; the 500 ml. vapor space was then charged with nitric oxide to a pressure of 15 p.s.i.g. (0.04 mole). The reactor was then heated to 200° C. at which time addition of oxygen was commenced at a steady rate of 155 ml. per minute until a pressure of 250 p.s.i.g. was attained. This required approximately 2½ hours during which the temperature was maintained at 200° C. The reactor was cooled to room temperature, the gases vented off and the contents discharged through a bottom-valve. Analysis (as above gave:

| | Grams |
|---|---|
| 2,6-dimethylnaphthalene | Nil |
| 6-methyl-2-naphthaldehyde (0.196 mole) | 33.4 |
| 6-methyl-2-naphthoic acid (0.009 mole) | 1.6 |
| 2,6-naphthalenedicarboxaldehyde (0.183 mole) | 33.7 |
| 6-formyl-2-naphthoic acid (0.023 mole) | 4.6 |
| 6-hydroxymethyl-2-naphthoic acid (0.001 mole) | 0.27 |
| 2,6-naphthalenedicarboxylic acid (<0.001 mole) | 0.17 |
| Unknown | 0.89 |
| Total | 74.64 |

This represents a 95 percent yield of the two naphthaldehydes.

EXAMPLE 2

To the reactor described in Example 1 was added 62.5 grams (0.40 mole) of 2,6-dimethylnaphthalene, 2.4 grams of selenium and 500 ml. of trichlorobenzene. The vapor space was purged with oxygen and then charged with oxygen at atmospheric pressure (0.02 mole). The reactor was heated to 200° C. and then nitric oxide was slowly pumped in until a pressure increase of 10 p.s.i. was achieved. Assuming ideal gas behavior and complete oxidation of the nitric oxide it was calculated from the pressure increase that the reactor then contained 0.03 mole of nitrogen dioxide. Oxygen was then added at a rate of 100 ml. per minute, while maintaining the temperature at 200° C., until a pressure of 250 p.s.i.g. was attained. Work-up and analysis as above gave:

| | Grams |
|---|---|
| 2,6-dimethylnaphthalene | Nil |
| 6-methyl-2-naphthaldehyde (0.109 mole) | 18.5 |
| 6-methyl-2-naphthoic acid (0.0006 mole) | 1.1 |
| 2,6-naphthalenedicarboxaldehyde (0.219 mole) | 40.4 |
| 6-formyl-2-naphthoic acid (0.055 mole) | 11.0 |
| 2,6-naphthalenedicarboxylic acid (0.002 mole) | 0.32 |
| Unknown | 0.78 |
| Total | 72.10 |

This represents an 82 percent yield of the two naphthaldehydes.

EXAMPLE 3

The reaction described in Example 2 was repeated using 0.25 gram of selenium metal instead of 2.4 grams. The product analysis was:

| | Grams |
|---|---|
| 2,6-dimethylnaphthalene (0.047 mole) | 7.3 |
| 6-methyl-2-naphthaldehyde (0.288 mole) | 49.0 |

EXAMPLE 4

The reaction described in Example 2 was repeated except no selenium metal was added. A black, tarry product resulted from which no normal oxidation products could be isolated. Further investigation revealed the presence of dimeric and polymeric hydrocarbons and chlorohydrocarbons, the latter arising from reaction with the solvent.

EXAMPLE 5

To the reactor described in Example 1 was added 62.5 grams (0.40 mole) of 2,6-dimethylnaphthalene, 2.4 grams of selenium metal and 500 ml. of trichlorobenzene. The vapor space was purged with nitrogen, then with nitric oxide and finally charged with nitric oxide at atmospheric pressure (0.02 mole). The reactor was then heated to 250° C. and maintained at that temperature which oxygen was added at 100 ml. per minute until a pressure of 250 p.s.i.g. was attained; this required three hours and ten minutes. Work-up and analysis as above gave:

| | Grams |
|---|---|
| 6-methyl-2-naphthaldehyde | Nil |
| 2,6-naphthalenedicarboxyaldehyde (0.117 mole) | 21.0 |
| 6-formyl-2-naphthoic acid (0.180 mole) | 36.1 |
| 2,6-naphthalenedicarboxylic acid (0.085 mole) | 18.4 |
| Total | 76.0 |

EXAMPLE 6

To the reactor described in Example 1 was added 62.5 grams (0.40 mole) of 2,6-dimethylnaphthalene, 2.4 grams of selenium metal and 500 ml. of trichlorobenzene. The vapor space was purged with oxygen and then charged with oxygen at atmospheric pressure (0.20 mole). The reactor was heated to 200° C. and nitric oxide was slowly pumped in until a pressure increase of 28 p.s.i. was achieved (equivalent to 0.050 mole of nitrogen dioxide). The reactor was then heated to 250° C. and maintained at that temperature while oxygen was added at the rate of 100 ml. per minute until a pressure of 250 p.s.i.g. was attained,[1] work-up and analysis as above gave:

| | Grams |
|---|---|
| 2,6-naphthalenedicarboxaldehyde | Trace |
| 6-formyl-2-naphthoic acid (0.044 mole) | 8.8 |
| 2,6-naphthalenedicarboxylic acid (0.315 mole) | 68.1 |
| Total (0.359 mole) | 76.9 |

This represents a 78.8 percent yield of the dicarboxylic acid and an 89.8 percent yield of total acidic products.

EXAMPLE 7

To the reactor described in Example 1 was added 62.5 grams (0.40 mole) of 2,6-dimethylnaphthalene, 2.4 grams of selenium metal and 500 ml. of o-dichlorobenzene. The vapor space was purged with oxygen and then charged with oxygen at atmospheric pressure. The reactor was heated to 200° C. and nitric oxide was slowly pumped in until a pressure increase of 32 p.s.i. was achieved (equivalent to 0.056 mole of nitrogen dioxide). The reactor was then heated to 250° C. and maintained at that temperature while oxygen was added at 100 ml. per minute until a pressure of 250 p.s.i.g. was attained; this required one hour. The reaction was continued for an additional 2½ hours with oxygen being added as needed to maintain the pressure at 250 p.s.i.g. Work-up and analysis as above gave:

| | Grams |
|---|---|
| 2,6-naphthalenedicarboxaldehyde | Trace |
| 6-formyl-2-naphthoic acid (0.046 mole) | 9.2 |
| 2,6-naphthalenedicarboxylic acid (0.330 mole) | 71.4 |
| Total (0.376 mole) | 80.6 |

This represents an 82.6 percent yield of dicarboxylic acid and a 94.1 percent yield of total acidic products.

EXAMPLE 8

To the reactor described in Example 1 was added 62.5 grams (0.40 mole) of 2,6-dimethylnaphthalene, 2.4 grams ---
[1] This required one hour. The reaction was continued for an additional 2¼ hours with oxygen being added as needed to maintain the pressure at 250 p.s.i.g.

of selenium metal and 500 ml. of trichlorobenzene. The vapor space was purged with nitrogen and then with oxygen and charged with oxygen at 30 p.s.i.g. (0.062 mole). The reactor was then heated to 200° C. and nitric oxide was slowly pumped in until a pressure increase of 30 p.s.i. was achieved (equivalent to 0.053 mole of nitrogen dioxide). The reactor was then heated to 300° C. and maintained at that temperature while oxygen was added at 100 ml. per minute until a pressure of 250 p.s.i.g. was attained; this required 5 minutes. The reaction was continued for an additional 30 minutes during which no further consumption of oxygen occurred. The black, tarry product was shown by the usual analytical procedure to contain less than ten percent combined yield of 2,6-naphthalenedicarboxylic acid and 6-formyl-2-naphthoic acid.

Although particular emphasis has been placed on the dialdehyde and diacid preparation, it is to be understood that the other oxidation products of the present process are also valuable and useful. Their principal utility is as intermediates for synthesis into either final product or other intermediates. However, those with two functional substituents are themselves quite useful for the preparation of polymers such as polyesters or polyurethanes. For example the hydroxymethylnaphthoic acid can be homo polymerized to produce a unique polyester. The particular value of the naphthalenedicarboxylic acids is in the preparation of polyesters. Polyesters prepared from 2,6-naphthalenedicarboxylic acid (or the dialkyl esters or acyl halides thereof) have high glass transition temperatures. The use of this monomer in place of terephthalic acid in poly(ethylene terephthalate) allows the preparation of fibers with superior high temperature properties for producing permanent press fabrics. Naphthalenedicarboxaldehyde is particularly useful for the preparation of thermosetting resins having high thermal stability.

The invention claimed is:

1. A process for the partial oxidation of dialkylnaphthalene comprising reacting dialkylnaphthalene in a solvent, in a reaction zone, with molecular oxygen in the presence of selenium and NO or $NO_2$ in a catalytic amount, while maintaining a liquid phase in the zone, the solvent being substantially inert in the reaction, and recovering the oxidation product.

2. The process according to claim 1 wherein the temperature of the reaction zone is in the range of about 160 to 275° C.

3. The process according to claim 2 wherein NO or $NO_2$ is present in the range of about 0.01 to 0.6 mole of NO or $NO_2$ per mole of dialkylnaphthalene and the selenium is present in an amount in the range of 0.1 to 6 weight percent of the dialkylnaphthalene.

4. The process according to claim 3 wherein the NO or $NO_2$ is present up to 0.3 mole per mole of dialkylnaphthalene.

5. The process according to claim 4 wherein the oxygen is present in at least the stoichiometric amount needed for the partial oxidation of the dialkylnaphthalene.

6. The process according to claim 5 wherein the oxygen is added to the reaction zone at least at the rate of oxygen consumption by the partial oxidation.

7. The process according to claim 6 wherein the solvent is a haloaromatic of the structure

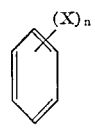

where X is bromo, chloro or fluoro and $n$ is 1 to 6 or mixtures thereof.

8. The process according to claim 7 wherein the solvent is di-, tri- or tetrachlorobenzene.

9. The process according to claim 8 wherein the alkyl substituents of the dialkylnaphthalene are unbranched chains of 1–10 carbon atoms.

10. The process according to claim 9 wherein the dialkylnaphthalene is dimethylnaphthalene.

11. The process according to claim 10 wherein the dimethylnaphthalene is 2,6-dimethylnaphthalene.

12. The process according to claim 2 wherein the temperature is in the range of about 160–225° C. and naphthalenedicarboxaldehyde is recovered.

13. The process according to claim 12 wherein the NO or $NO_2$ is present in the range of about 0.01 to 0.6 mole of $NO_2$ per mole of dialkylnaphthalene and the selenium is present in an amount in the range of 0.1 to 6 weight percent of the dialkylnaphthalene.

14. The process according to claim 13 wherein the NO or $NO_2$ is present up to 0.3 mole per mole of dialkylnaphthalene.

15. The process according to claim 14 wherein the oxygen is present in at least the stoichiometric amount needed for the partial oxidation of the dialkylnaphthalene provided the oxygen is added to the reaction zone at least at the rate of oxygen consumption by the partial oxidation.

16. The process according to claim 15 wherein the solvent is a haloaromatic of the structure

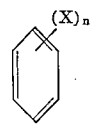

where X is bromo, chloro or fluoro and $n$ is 1 to 6 or mixtures thereof.

17. The process acccording to claim 16 wherein the solvent is di- tri- or tetrachlorobenzene.

18. The process according to claim 17 wherein the alkyl substituents of the dialkylnaphthalene are unbranched chains of 1–10 carbon atoms.

19. The process according to claim 18 wherein the dialkylnaphthalene is dimethylnaphthalene.

20. The process according to claim 19 wherein the dimethylnaphthalene is 2,6-dimethylnaphthalene.

21. The process according to claim 2 wherein the temperature is in the range of about 225 to 275° C. and naphthalenedicarboxylic acid is recovered.

22. The process according to claim 21 wherein the NO or $NO_2$ is present in the range of about 0.01 to 0.6 mole of NO or $NO_2$ per mole of dialkylnaphthalene and the selenium is present in an amount in the range of 0.1 to 6 weight percent of the dialkylnaphthalene.

23. The process according to claim 22 wherein the NO or $NO_2$ is present up to 0.3 mole per mole of dialkylnaphthalene.

24. The process according to claim 23 wherein the oxygen is present in at least the stoichiometric amount needed for the partial oxidation of the dialkylnaphthalene provided the oxygen is added to the reaction zone at least at the rate of oxygen consumption by the partial oxidation.

25. The process according to claim 24 wherein the solvent is a haloaromatic of the structure

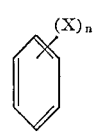

where X is bromo, chloro or fluoro and $n$ is 1 to 6 or mixtures thereof.

26. The process according to claim 25 wherein the solvent is di-, tri- or tetrachlorobenzene.

27. The process according to claim 26 wherein the alkyl substituents of the dialkylnaphthalene are unbranched chains of 1–10 carbon atoms.

28. The process according to claim 27 wherein the dialkylnaphthalene is dimethylnaphthalene.

29. The process according to claim 28 wherein the dimethylnaphthalene is 2,6-dimethylnaphthalene.

30. The process according to claim 3 wherein NO is present.

31. The process according to claim 13 wherein NO is present.

32. The process according to claim 22 wherein NO is present.

References Cited

UNITED STATES PATENTS

| | | | |
|---|---|---|---|
| 2,815,373 | 12/1957 | Mayurnik | 260—524 |
| 2,839,575 | 6/1958 | Fetterly | 260—524 |
| 3,277,154 | 10/1966 | Vanderwerff | 260—524 |
| 3,288,823 | 11/1966 | Vanderwerff | 260—599 |

LORRAINE A. WEINBERGER, Pimary Examiner

R. S. WEISSBERG, Assistant Examiner

U.S. Cl. X.R.

260—524 N, 599